United States Patent
Bauchot et al.

(10) Patent No.: US 9,088,551 B2
(45) Date of Patent: Jul. 21, 2015

(54) METHOD AND SYSTEM FOR EASILY AND SECURELY MANAGING MULTIPLE KEYS USED TO HAVE ACCESS TO MULTIPLE COMPUTING RESOURCES

(75) Inventors: Frederic Bauchot, Saint-Jeannet (FR);
Jean-Luc Collet, La Gaude (FR);
Francois X. Drouet, La Gaude (FR);
Gerard Marmigere, Drap (FR)

(73) Assignee: International Business Machines Corporation, Armonk, NY (US)

( * ) Notice: Subject to any disclaimer, the term of this patent is extended or adjusted under 35 U.S.C. 154(b) by 1834 days.

(21) Appl. No.: 11/451,678

(22) Filed: Jun. 13, 2006

(65) Prior Publication Data
US 2007/0005975 A1     Jan. 4, 2007

(30) Foreign Application Priority Data
Jun. 29, 2005     (EP) ..................................... 05300530

(51) Int. Cl.
*H04L 29/06*     (2006.01)
*G06F 21/10*     (2013.01)

(52) U.S. Cl.
CPC ............... *H04L 63/06* (2013.01); *H04L 63/062* (2013.01); *G06F 21/10* (2013.01)

(58) Field of Classification Search
CPC ........ H04L 63/06; H04L 63/062; G06F 21/10
USPC ......... 713/171, 185, 153, 155, 165, 168, 193; 726/18; 380/44, 45, 277, 278, 281
See application file for complete search history.

(56) References Cited

U.S. PATENT DOCUMENTS 5,157,763 A     10/1992 Peters et al.
5,471,612 A  *  11/1995 Schlafly .................... 715/210
(Continued)

OTHER PUBLICATIONS

Cunningham, H. Conrad, and Jingyi Wang. "Building a layered framework for the table abstraction." Proceedings of the 2001 ACM symposium on Applied computing. ACM, 2001.(pp. 668-674).*

(Continued)

*Primary Examiner* — Luu Pham
*Assistant Examiner* — Kari Schmidt
(74) *Attorney, Agent, or Firm* — Scully, Scott, Murphy & Presser, P.C.; David L. Adour, Esq.

(57) ABSTRACT

The present invention is directed to a system, method and computer program for easily and securely managing multiple keys on a computer, each key being used to access one or a plurality of computing resources. The method comprises the steps of receiving a command for selecting a key among one or plurality of keys, each key comprising one or a plurality of key fields; receiving a command for activating a computing resource corresponding to the selected key in order to have access to the computing resource; retrieving and displaying on a computer screen, the one or plurality of key fields associated with the selected key; displaying on the computer screen one or a plurality of input fields, each input field being used to enter the content of an appropriate key field associated with the key selected to access the activated computing resource; passing, in response to an action of a pointing device on a displayed key field, the content of the key field in an appropriate input field of the activated computing resource; and having access to the activated computing resource when all key fields of the selected key have been passed to the appropriate input fields.

17 Claims, 9 Drawing Sheets

(56) References Cited

U.S. PATENT DOCUMENTS

| | | | |
|---|---|---|---|
| 5,874,963 A * | 2/1999 | Johnson et al. | 715/856 |
| 6,169,976 B1 * | 1/2001 | Colosso | 705/59 |
| 6,526,512 B1 * | 2/2003 | Siefert et al. | 726/21 |
| 6,643,784 B1 * | 11/2003 | McCulligh | 726/18 |
| 6,651,217 B1 * | 11/2003 | Kennedy et al. | 715/224 |
| 6,981,028 B1 * | 12/2005 | Rawat et al. | 709/217 |
| 6,981,138 B2 * | 12/2005 | Douceur et al. | 713/153 |
| 7,000,108 B1 * | 2/2006 | Yarsa et al. | 713/167 |
| 7,216,292 B1 * | 5/2007 | Snapper et al. | 715/236 |
| 2004/0205526 A1 * | 10/2004 | Borodovski et al. | 715/505 |
| 2004/0250215 A1 | 12/2004 | Chen et al. | |
| 2006/0018484 A1 * | 1/2006 | Yoshihiro et al. | 380/277 |
| 2006/0061795 A1 * | 3/2006 | Walmsley | 358/1.14 |
| 2006/0106927 A1 * | 5/2006 | Brey et al. | 709/224 |
| 2006/0117103 A1 * | 6/2006 | Brey et al. | 709/225 |
| 2006/0179309 A1 * | 8/2006 | Cross et al. | 713/168 |
| 2007/0217613 A1 * | 9/2007 | Lam et al. | 380/277 |

OTHER PUBLICATIONS

Von Laszewski, Gregor, and Mikhail Sosonkin. "A Grid Certificate Authority for Community and Ad-hoc Grids." Parallel and Distributed Processing Symposium, 2005. Proceedings. 19th IEEE International. IEEE, 2005.*

Yee, Ka-Ping, and Kragen Sitaker. "Passpet: convenient password management and phishing protection." Proceedings of the second symposium on Usable privacy and security. ACM, 2006. (pp. 32-43).*

* cited by examiner

METHOD AND SYSTEM FOR EASILY AND SECURELY MANAGING MULTIPLE KEYS USED TO HAVE ACCESS TO MULTIPLE COMPUTING RESOURCES

BACKGROUND OF THE INVENTION

1. Field of the Invention

The present invention is directed to security in the field of data processing, and in particular to a method, system and computer program for easily and securely managing multiple keys used to have access to one or a plurality of computing resources.

2. Background Art

To reach sensible pieces of information, users must first be authorized to have access to the applications, web pages, or databases containing this sensible information. In fact, sensible information can be in any kind of information repository, application or computing resource. Such information repositories or computing resources, regardless of their nature and implementation, will be referred to herein as "DataSets". The access to a DataSet is usually protected to avoid unauthorized users to retrieve information that they are not allowed to reach. The protection of information and the control of its access are typically achieved by means of user identifiers (UserId) and passwords. In some cases, the protection and control means are not limited to UserId and password, and may also comprise other fields like an account identifier (AccountId), or a server identifier (ServerId), etc . . . All these pieces of information required to get access to a given DataSet will be referred to herein as the "Key", regardless of the number of individual fields (such as UserId, or password, or AccountId, etc . . . ).

The number of Keys that typical users must own (either for business or personal needs) is such that the observance by these users of the password management policies (like the rules password must comply with, or the frequency for updating password) lacks efficiency, safety and friendliness. Indeed all users have to record one way or the other, multiple Keys. The record of these Keys rends them either unsecured or difficult to locate. Typical examples of this situation are:

To record all the Keys on a piece of paper. This turns the Key update into a poorly convenient task. This requires that this piece of paper is always available, and this is by far unsafe, as Keys are obviously not ciphered when they are hand written on a piece of paper.

To record all the Keys within a text file recorded on the computer from where the DataSet are accessed. Key updates are becoming less cumbersome as they consist in editing the file, and the availability of the Keys is ensured. Nevertheless this creates a security breach as an individual getting access to the computer where the file is recorded would automatically get access to all the Keys this file records.

To record all the Keys within a DataSet, the access of which is controlled by a Key. This solves to some extent the risk issue described above, but creates a "chicken and egg" situation because the access to the Keys requires a Key.

Furthermore, assuming that the user accepts to afford the above limitations and deficiencies, once a Key has been accessed, it must then be properly specified by the user to the target DataSet. This is a task prone to error as the elements constituting the Key must be specified in the right fields (do not swap the UserId and the AccountId for instance), and must be entered without spelling error (everybody has already once given a password with the Caps Lock key on . . . ). If the maximum number of retries for specifying the Key is reached, then the access can simply be lost, potentially putting the user in a tricky situation if the access to the DataSet is required for instance for critical business needs.

Put in other words, the problem is to manage a set of keys that can open doors with the following concerns:
Which is the right key for opening this door?
How to use this key for opening the door?
Where did I put the key?
Is the key strongly secured?

SUMMARY OF THE INVENTION

An object of the present invention is to safely and securely record multiple keys, each Key comprising one or a plurality of fields, each Key being used to have access to one or a plurality of controlled computing resources.

Another object of the invention is to exchange in a user-friendly way, one or a plurality of fields constituting a Key with a computing resource.

Another object of the invention is to exchange in a user friendly way, one or a plurality of fields constituting a Key with a computing resource by means of a "copy-and-multiple-paste" operation (by clicking the pointing device each time it overlays on of the target entry fields).

Another object of the invention is to exchange in a user-friendly way, one or a plurality of fields constituting a Key with a computing resource, by dynamically updating the pointing device according to the currently exchanged field.

Another object of the invention is to exchange in a user friendly way, one or a plurality of fields constituting a Key with a computing resource, by selectively navigating within the set of fields constituting the Key (by scrolling among the set of fields).

Another object of the invention is to manage Keys using means for creating, updating or deleting keys.

Another object of the invention is to avoid any modification of computing resources (applications running on the computer system).

The present invention is directed to a method and system for easily and securely managing multiple keys on a computer, each key being used to access one or a plurality of computing resources. The method comprises the steps of receiving a command for selecting a key among one or plurality of keys, each key comprising one or a plurality of key fields; receiving a command for activating a computing resource corresponding to the selected key in order to have access to said computing resource; retrieving and displaying on a computer screen, the one or plurality of key fields associated with the selected key; displaying on the computer screen one or a plurality of input fields, each input field being used to enter the content of an appropriate key field associated with the key selected to access the activated computing resource; passing, in response to an action of a pointing device on a displayed key field, the content of the key field in an appropriate input field of the activated computing resource; and having access to the activated computing resource when all key fields of the selected key have been passed to the appropriate input fields.

The foregoing, together with other objects, features, and advantages of this invention can be better appreciated with reference to the following specification, claims and drawings.

BRIEF DESCRIPTION OF THE DRAWINGS

The novel and inventive features believed characteristics of the invention are set forth in the appended claims. The invention itself, however, as well as a preferred mode of use, further objects and advantages thereof, will best be understood by reference to the following detailed description of an illustrative detailed embodiment when read in conjunction with the accompanying drawings, wherein:

PREFERRED EMBOIDMENT OF THE INVENTION

The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

The present invention is based on a virtual "KeyRing" which allows:

To safely and securely record multiple Keys.

To easily manage Keys (creation/change/deletion of Keys).

To establish an association between a DataSet and a Key (this association may be a 1-to-N association as a given Key may give access to multiple DataSets).

To easily and error free pass the Key from the KeyRing to the DataSet.

To define a Key as a set of individual fields.

To identify, and potentially select, each field of a Key through a dynamic display of the pointing device icon, when passed to the DataSet The solution described hereafter is considered as a preferred embodiment of the present invention. This preferred solution relies on the Microsoft Windows operating system family.

In the preferred embodiment of the present invention described herein, it will assumed that any Key comprises up to 8 different fields, but no more. This limitation does not limit the scope of the present invention, as any alternate implementation with more than 8 fields per Key would be a straightforward extension of the preferred embodiment.

KeyRing Application

Figure 1:
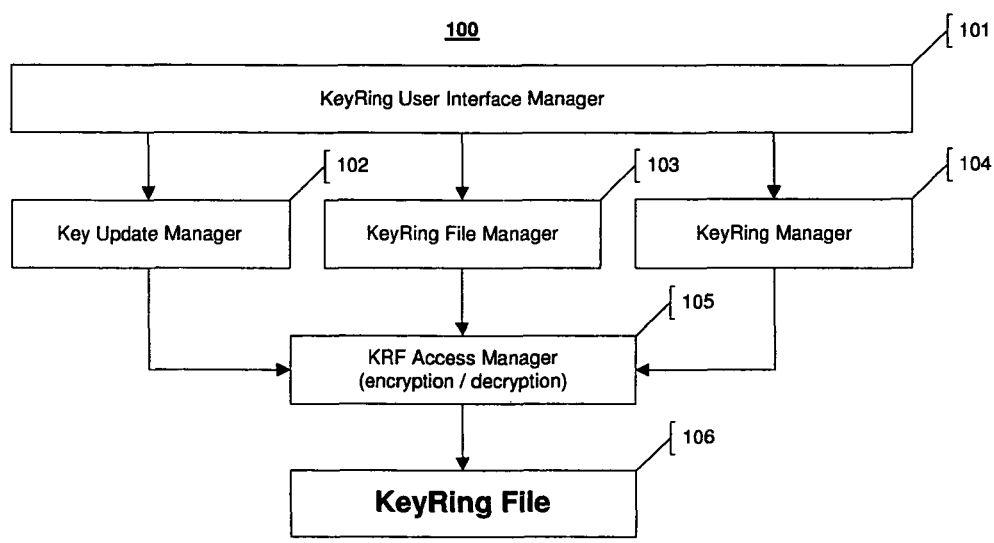
FIG. 1 shows the different components of the KeyRing application according to the present invention.

The core of the present invention is the concept of a KeyRing File, which is used to record multiple Keys associated with DataSets. This file is ciphered as it records very sensitive information, and it can only be accessed by means of relevant KeyRing processes through dedicated interfaces. This overall solution concept is further described in the following FIG. 1, which positions the different components comprising the KeyRing application 100.

The KeyRing User Interface Manager 101 is the process interfacing the user for interacting with the other components of the KeyRing solution. In the preferred embodiment of the present invention, this KeyRing User Interface Manager complies with the GUI standards as defined in the Microsoft Windows environment. The Key Update Manager 102 is the component in charge of managing any update in the definition of the Keys as recorded within the current KeyRing File. This component interacts on one hand with the KeyRing User Interface Manager 101 for interfacing with the user, and on the other hand, with the KeyRing File Access Manager 105 for read & write operations onto the KeyRing File 106.

The KeyRing File Manager 103 is the component in charge of managing the creation and the use of the KeyRing Files 106. This component interacts on one hand with the KeyRing User Interface Manager 101 for interfacing with the user, and on the other hand with the KeyRing File Access Manager 105 for read & write operations onto the KeyRing File 106. The KeyRing Manager 104 is the component in charge of passing Key fields to selected DataSets. This component interacts on one hand with the KeyRing User Interface Manager 101 for interacting with the user, and on the other hand with the KeyRing File Access Manager 105 for read operations onto the KeyRing File 106. The KeyRing File Access Manager 105 is the component in charge of accessing the KeyRing File 106, as required by the above components: Key Update Manager 102, or KeyRing File Manager 103, or KeyRing Manager 104. The KeyRing File Access Manager 105 interacts directly with the KeyRing File 106, either for file read operation, or for file write operation, or for file creation operation, or for file load operation, or for file save operation. As the KeyRing File 106 is encrypted through an AES (Advanced Encryption Standard) based algorithm, the KeyRing File Access Manager 105 is in charge of the file corresponding encryption and decryption operations.

The KeyRing File 106 is the repository where Keys are recorded. KeyRing Files 106 are created under the control of the KeyRing File Manager 103, whereas the KeyRing File records corresponding to individual Keys are managed under the control of the Key Update Manager 102. Finally Key fields, as recorded in the KeyRing File 106, are passed to the DataSets under the control of the KeyRing Manager 104. These three components 102, 103 and 104 use the services of the KeyRing File Access Manager 105 for interacting with the KeyRing File 106.

KeyRing Table

Figure 2:
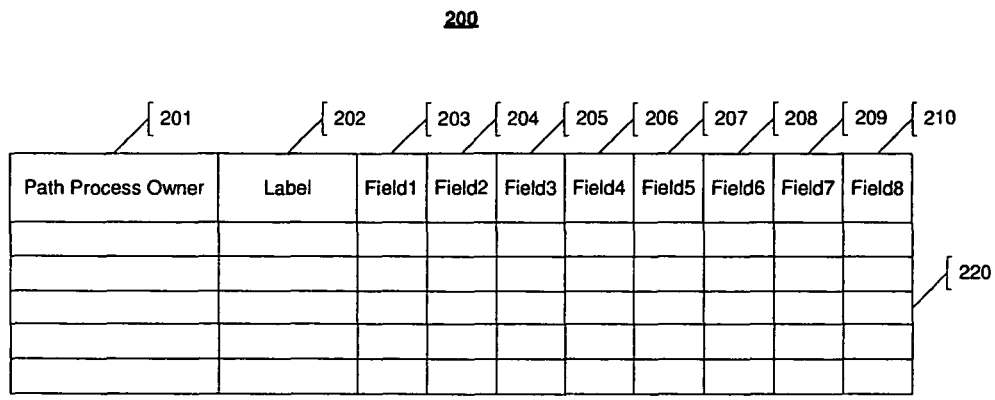
FIG. 2 shows the KeyRing table according to the present invention.

The structure of the KeyRing File 106 is depicted in FIG. 2. This file is structured as a two dimension KeyRing Table 200 (KRT for short) comprising one or a plurality of records 220, each record 220 corresponding to a given Key, and comprising the following elements: the "Path Process Owner" element 201, the "Label" element 202, and the "Field1 to Field4" elements 203 to 206. The "Path Process Owner" element 201 specifies the name of the DataSet associated with the Key. For the cases where the DataSet corresponds to an executable application, then this element 201 is the path of this application (for instance "c:\program files\Notes\Notes.exe"). For the cases where the DataSet is reached through a Web browser, then this element 201 is the URL identifying the DataSet (for instance "www.delphion.com"). The "Label" element 202, allows the user to define a nickname for the DataSet associated with the Key.

The "Field1" to "Field4" elements 203 to 206 are used to record each field constituting the Key defined by the record 220. Each Field element is comprised of 3 sub-fields:

The sub-field "Name" 230 which comprises the nickname associated with the Key (value displayed together with the mouse cursor).

The sub-field "Key" 231 which comprises the value of the Key field to be pasted on the Dataset entry field.

The sub-field "P" 232 which indicates whether the value is protected "1" or not "0". If the value is protected, then the value can/must only be pasted in a protected field.

Generic Process Workflow

The following description gives flow is an example of one possible scenario illustrating the different operations available with the KeyRing solution, according to a preferred embodiment of the present invention.

Launching the KeyRing

The KeyRing generic process starts when the user decides to launch the KeyRing application. This leads to invoke the KeyRing User Interface Manager 101, which displays on the computer screen the dialog box corresponding to figure FIG. 3A. This dialog box window comprises the following objects: A menu bar with an icon 301 invoking the KeyRing File Manager 103 for the creation of a new KeyRing File 106, an icon 302 invoking the KeyRing File Manager 103 for opening of an existing KeyRing File 106, an icon 303 invoking the KeyRing File. Manager 103 for saving of the currently opened KeyRing File 106, an icon 304 invoking the KeyRing File Manager 103 for saving of the current KeyRing File 106 under a new name ("Save As" operation), an icon 305 invoking KeyRing options, and an icon 306 invoking an on-line Help tool.

The dialog box also comprises an information field 307 where the user can find hints and tips for using the KeyRing system, and 1A gold Key Icon 308 that the user must drag for passing the fields of the current Key to the target DataSet, under the control of the KeyRing Manager 104. 1A list box 309 where the user can select one of the Keys defined as part of the current KeyRing File 106. A push-button "Edit Key" 310 invoking, when clicked, the Key Update Manager 102 for changing the definition of the existing key whose "Label" element 202 appears in the list box 309. 1A push-button "Remove Key" 311 invoking, when clicked, the Key Update Manager 102 for deleting in the current KRT 200, the existing key whose "Label" element 202 appears in the list box 309. A push-button "Add Key" 312 invoking, when clicked, the Key Update Manager 102 for introducing a new Key in the current KRT 200 recorded in the KeyRing File 106. A check box 313 used to specify if the KeyRing dialog box 300 must be kept or not in the foreground of the window display.

Loading a KeyRing File

Figure 3A:
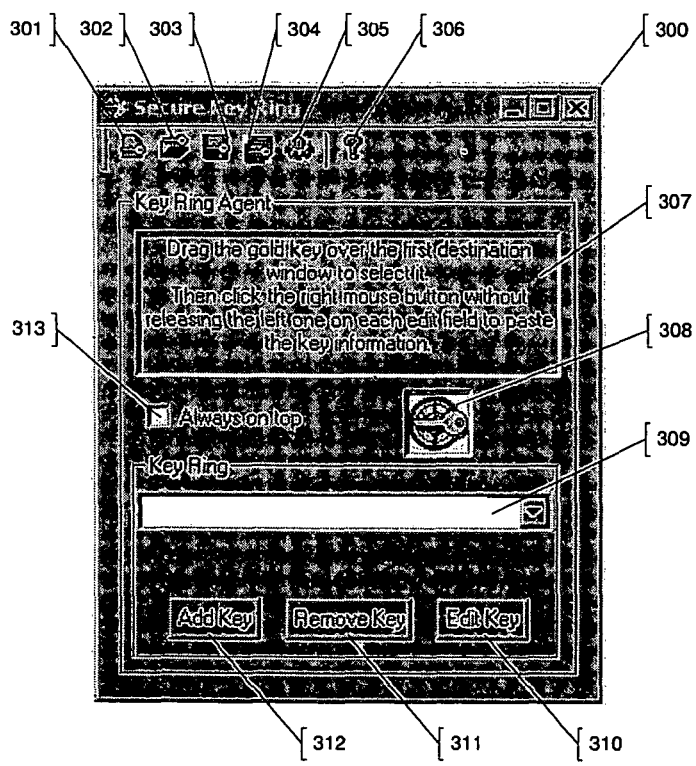
FIG. 3A shows the dialog box displayed on the computer screen when the user decides to launch the KeyRing application for the creation of a new KeyRing File or for the opening or saving of an existing KeyRing File according to the present invention.
Figure 3B:
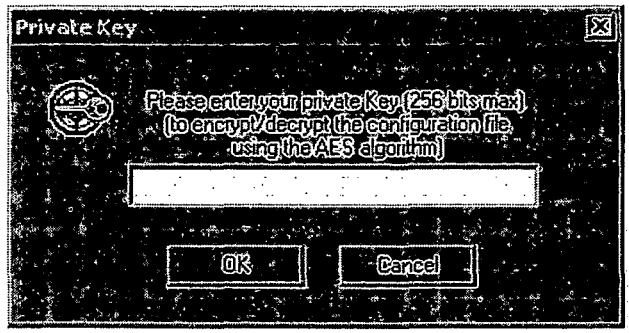
FIG. 3B shows the dialog box displayed on the computer screen in order to retrieve the secret private Key under which all the information recorded in the KeyRing File will be encrypted according to the present invention.
Figure 3C:
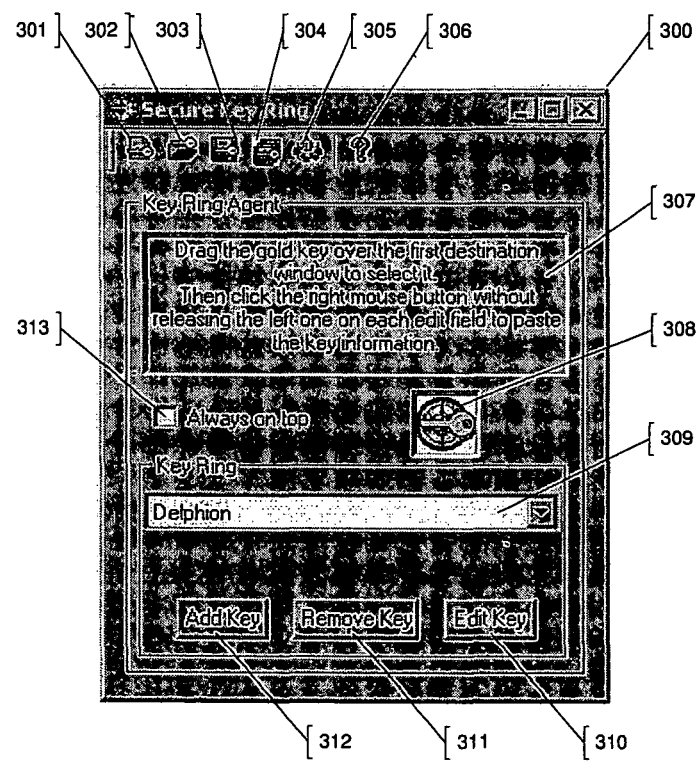
FIG. 3C shows when the secrete private Key has been successfully specified, the dialog box displayed on the computer screen according to the present invention, with the Key labeled as "Delphion" in the list box.

This operation is triggered by clicking with the pointing device (e.g. the mouse) on the second icon 302 on the left side of the menu available on the top of the KeyRing user interface dialog box as shown on FIG. 3A. This allows an existing KeyRing File 106 to open through conventional file system navigation windows. Alternatively the user can also create a new KeyRing File 106 by clicking on the left most icon 301 on the menu bar available on the top of the KeyRing user interface dialog box. In both cases, the KeyRing File Manager 103 takes control for calling first the KeyRing File Access Manager 105 in order to open an existing or create a new KeyRing File 106, and second the KeyRing User Interface Manager 101 for displaying the dialog box shown in FIG. 3B, in order to retrieve the secret private Key under which will be encrypted all the information recorded in the KeyRing File 106, according to the structure described in the KRT 200. When the secret private Key has been successfully specified, then the current KeyRing File 106 becomes available; with all the Keys it records, so that further KeyRing operations can take place. At this point the KeyRing User interface dialog window takes the form illustrated on FIG. 3C where one can see that a Key labeled as "Delphion" appears in the list box 309 ("Delphion" is a trademark of Thomson Scientific Inc. in certain countries).

Editing an Existing Key

Figure 3D:
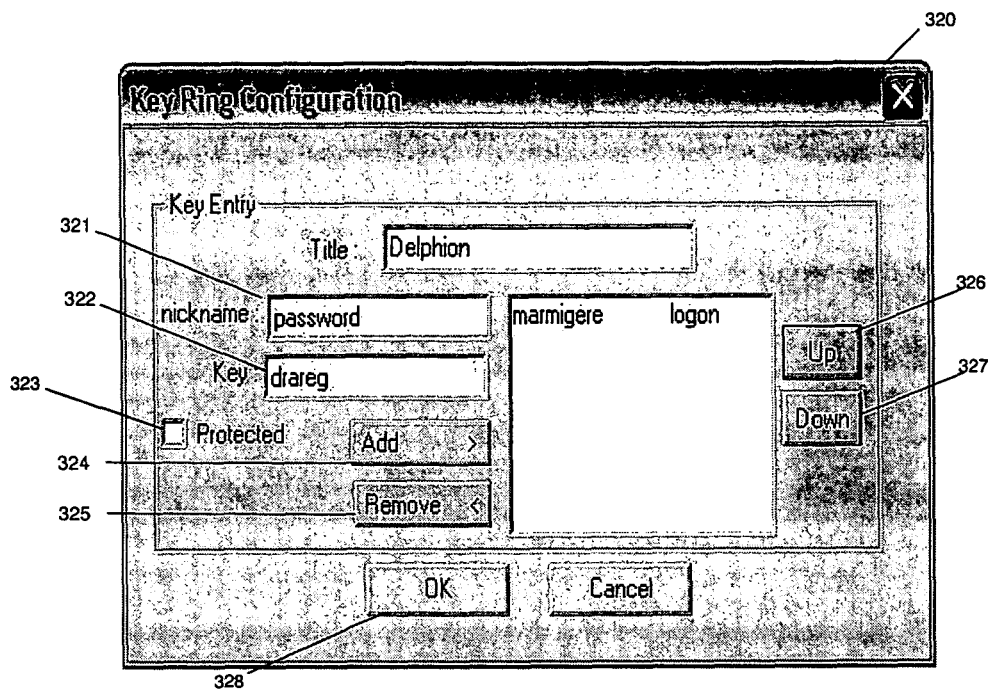
FIG. 3D shows the dialog box displayed on the computer screen aimed to assist the user to update the current definition of the fields constituting the selected Key according to the present invention.

As previously said, this operation is triggered by clicking on the icon 310, and invokes the Key Update Manager 102. This leads to open another dialog box 320, as illustrated in FIG. 3D, aimed to assist the user to update the current definition of the fields constituting the selected key. This dialog box 320 includes several means (entry fields, push-buttons, list box, etc . . . ) which will not be further detailed here as their usage is obvious to a person used to deal with windows based computer systems. When the user will close the dialog box 320 without canceling any done change, the KRT 200 table, recorded in the current KeyRing File 106, will be updated by reflecting the new definition in the record 220 corresponding to the selected Key.

Adding a New Key

As previously said, this operation is triggered by clicking on the icon 312, and invokes the Key Update Manager 102. This leads to open a dialog box identical to the dialog box 320, as illustrated in FIG-3D, but where all the entry fields are left void. This dialog box 320 includes several means (entry fields, push-buttons, list box, etc . . . ). The Nickname field 321 is the name associated with the Key. This nickname is displayed on the mouse cursor indicating the type of value to be pasted. The Key field 322 is the value to be pasted. The Checkbox 323 indicates, if checked, that the value specified in the Key field 322 is protected and may be not be pasted in an unprotected field for security reason. The buttons Up 326 and Down 327 allow the user to reorder if necessary the couple nickname/key. When the user will close the dialog box 320 without canceling the new Key definition, the KRT 200 table, recorded in the current KeyRing File 106, will be updated by introducing a new record 220 corresponding to the new Key definition.

Removing an Existing Key

As previously said, this operation is triggered by clicking on the icon 311, and invokes the Key Update Manager 102. This leads to update the KRT 200 table, recorded in the current KeyRing File 106, by removing the record 220 corresponding to the selected Key.

Passing a Key to a DataSet

Figure 3E:
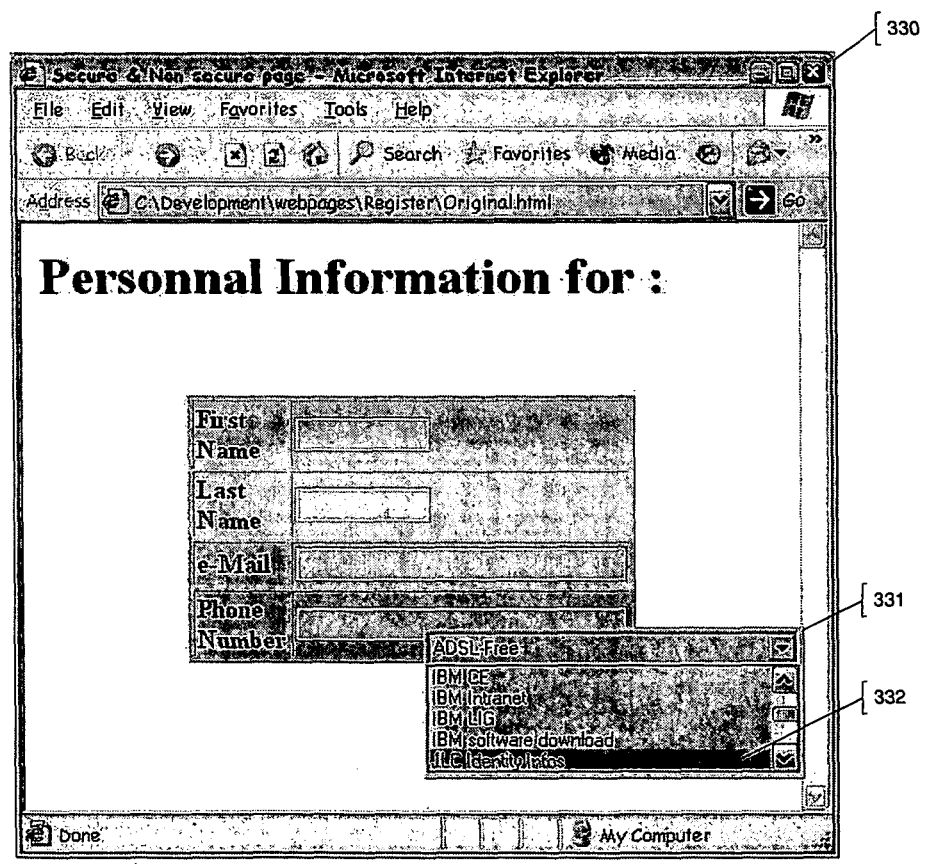
FIG. 3E shows the pop-up window displayed on the computer screen listing the different Keys defined within the current KeyRing File according to the present invention.

This operation must be easily performed to allow the user to take full advantage of the present invention. In a preferred embodiment of the present invention, a combined mouse and keyboard short cut is defined to activate the KeyRing application 100. When a given application is active, if the user hits altogether the F12 key and the right mouse button, the KeyRing application 100 gets active, so that the KeyRing User Interface Manager 101 displays a pop-up windows listing the different Keys defined within the current KeyRing File 106. This is illustrated in the FIG. 3E where the active application is a web browser represented by the window 330. When the (F12+Right mouse button) short cut is hit, the pop-up window 331 is displayed, and the user can for instance select the Key 332 identified by the label "JLC Identity Infos".

Then the user can very easily pass the different fields defined as part of the selected Key to the target DataSet. This is performed by first clicking on the selected Key 332 with the left button of the pointing device, and without releasing this left button, dropping one after the other each field of the Key by clicking the right button of the pointing device onto the destination input area. At each step of this operation, the mouse icon takes a different form to indicate to the user the current stage of the key field dropping process. This operation is illustrated in FIG. 3F and FIG. 3G, where the form of the mouse icon shows how many remaining fields are still to be passed to the target DataSet.

Figure 3F:
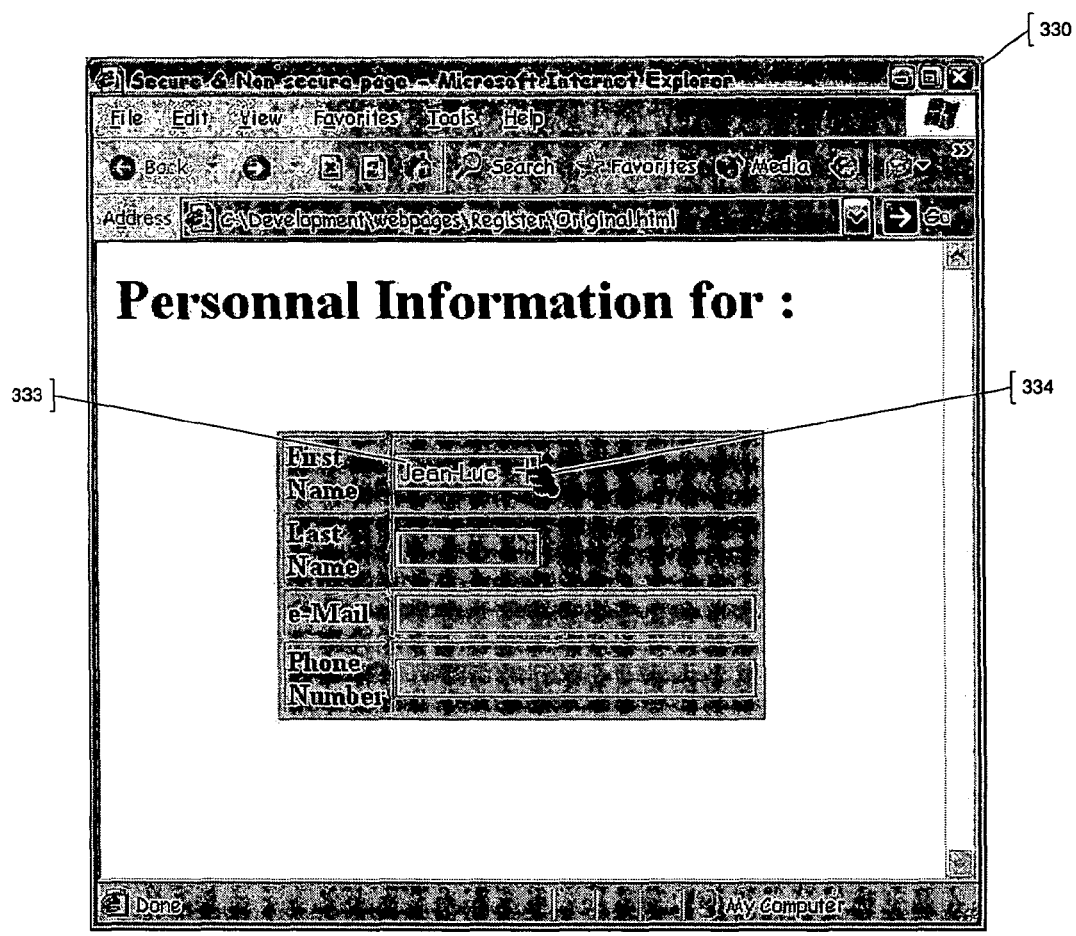
FIG. 3F shows the screen corresponding to the step where the user has already dropped the first field "Jean-Luc" onto the first input area aimed to host a first name according to the present invention.

The first FIG. 3F corresponds to the step where the user has already dropped the first field "Jean-Luc" onto the first input area 333 aimed to host a first name. At this stage the mouse icon 334 takes the form of a triple Key, meaning that there are still three remaining fields not yet passed from the Key.

Figure 3G:
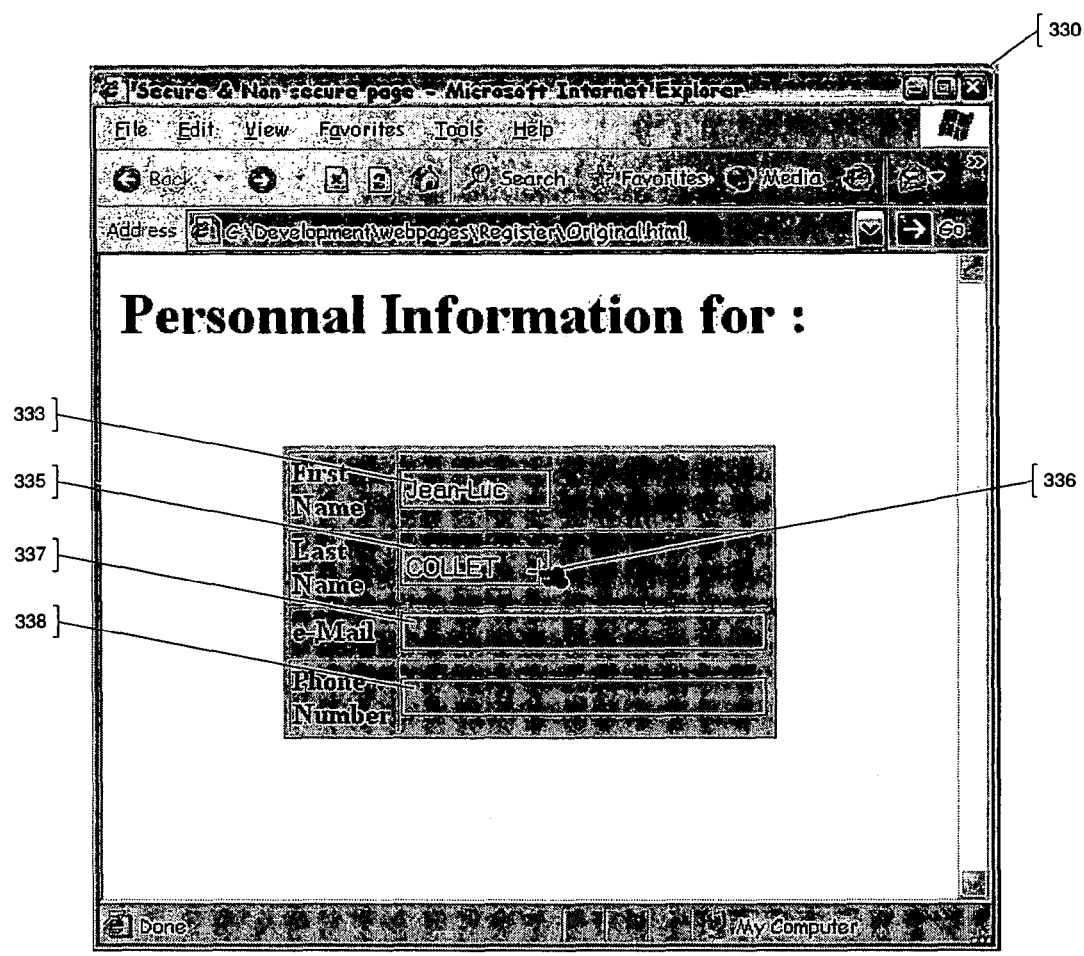
FIG. 3G shows the screen corresponding to the step where the user has dropped the second field "COLLET" onto the second input area aimed to host a last name according to the present invention.

The FIG. 3G corresponds to the step where the user has dropped the second field "COLLET" onto the second input area 335 aimed to host a last name. At this stage the mouse icon 336 takes the form of a double Key, meaning that there are still two remaining fields not yet passed from the key. The last two Key fields are then dropped similarly onto the last two entry areas 337 and 338.

Another Example of Execution

Figure 4A:
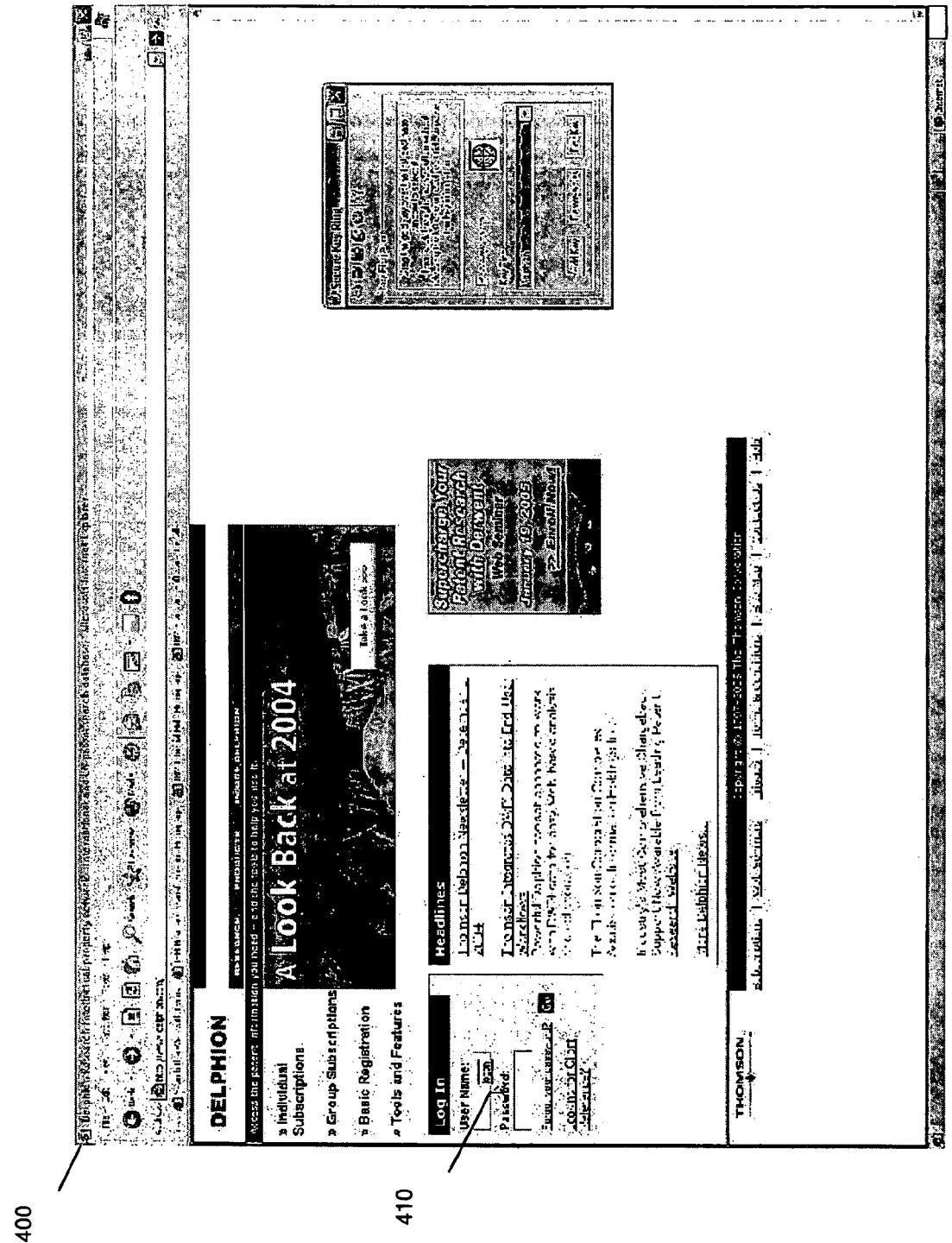
FIG. 4A shows an example of execution according to the present invention with a Key comprising two fields.
Figure 4B:
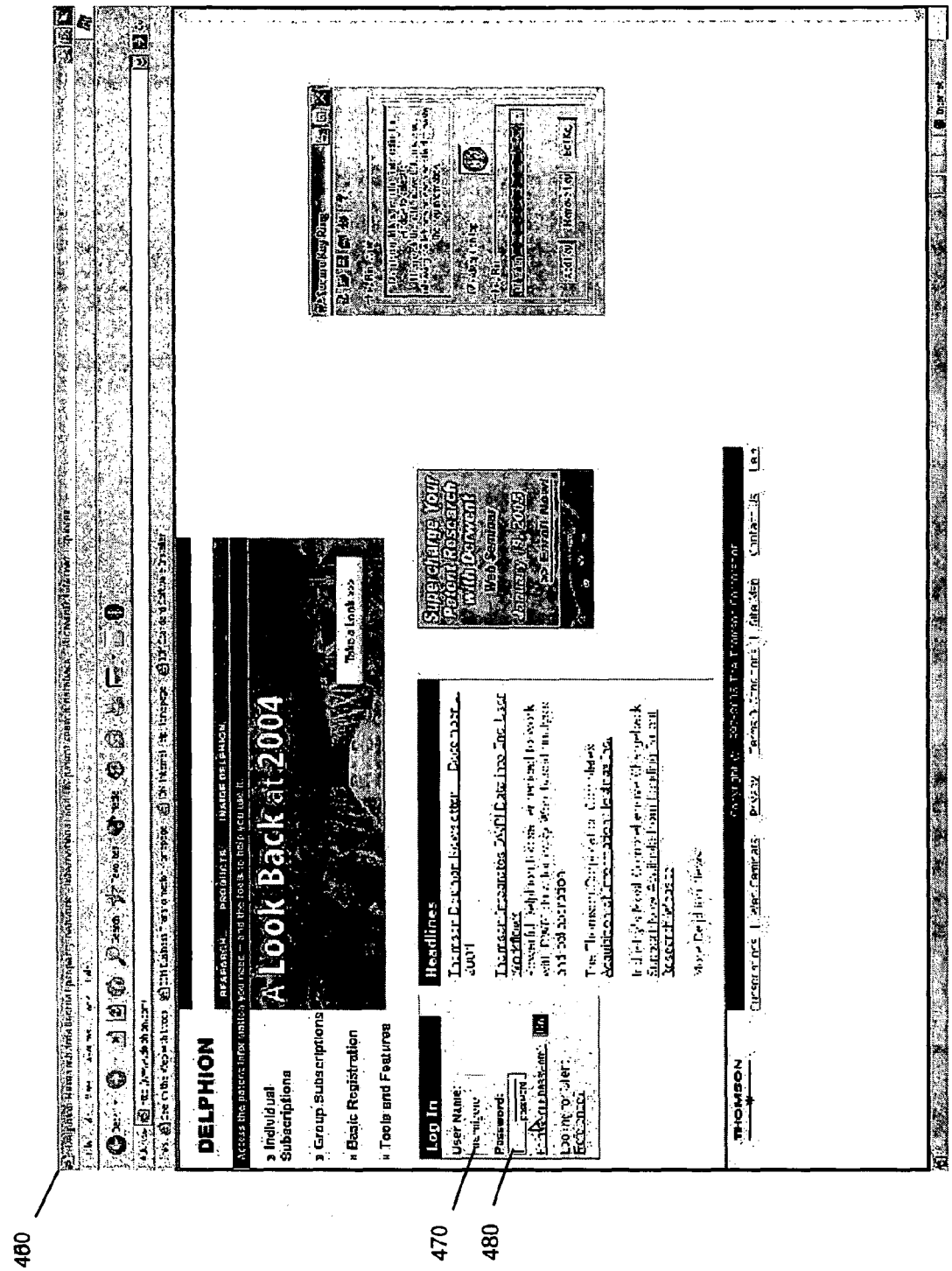
FIG. 4B shows the same screen as in FIG. 4A after pasting the first value according to the present invention.

FIGS. 4A and 4B show a sample execution with a Key of 2 fields, and where the mouse icon form is changed in order to display a short text specifying the nature of the current Key field. In FIG. 4A, a prompt is displayed 400 to logon the "Delphion" server, mouse pointer 410 display the nickname associated with the value which is pasted when the mouse key is pressed (in our case "logon").

Figure 5:
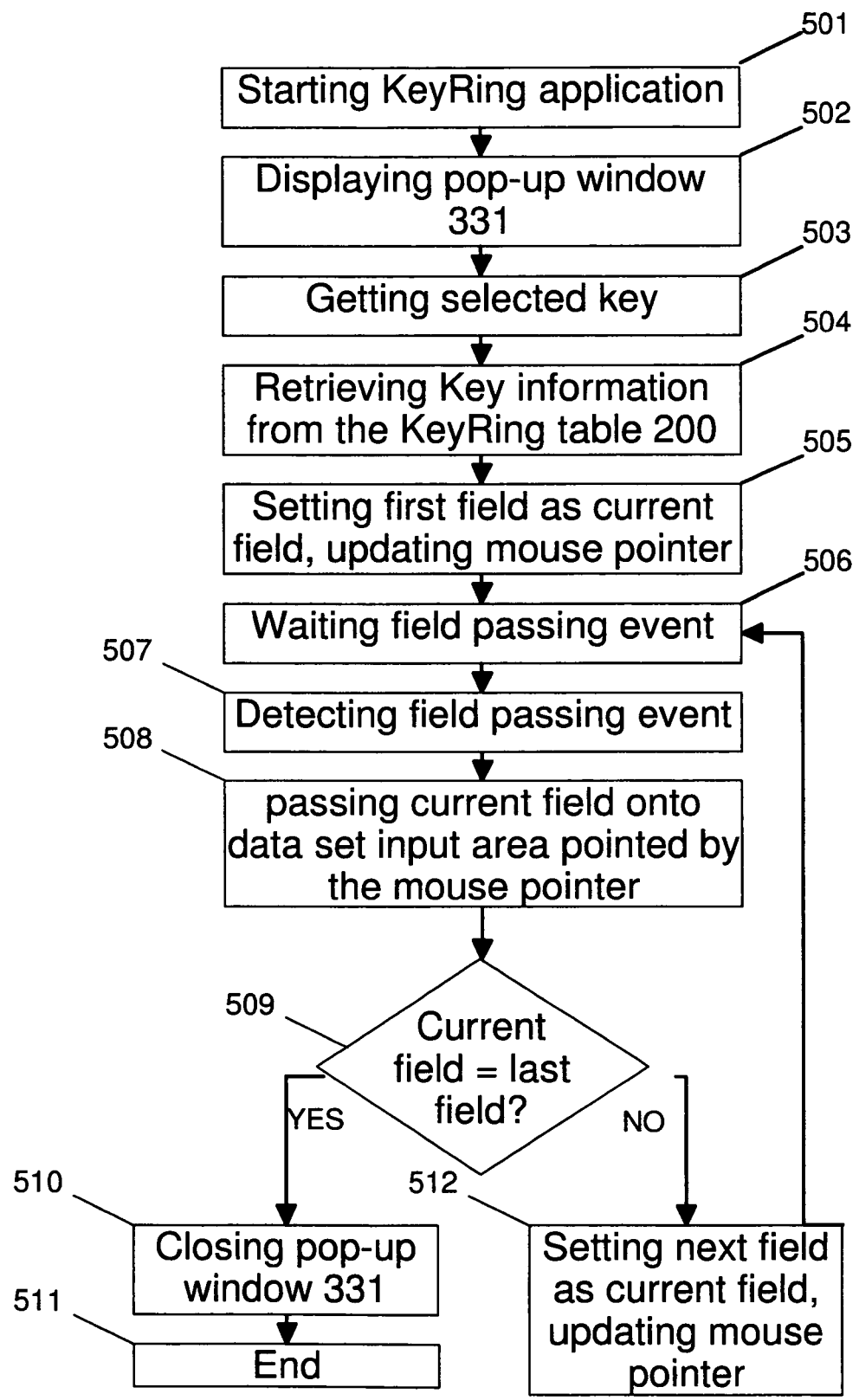
FIG. 5 is a flow chart of the method of passing Keys according to the present invention.

FIG. 4B shows the same screen after pasting the first value. The logon which is a non protected value is displayed in User Name field 470, while the nickname associated to the next value is displayed with the mouse cursor 480 (In our case "password") KeyRing Method FIG. 5 illustrates the method according to the present invention, for passing the plurality of fields associated to a Key, onto the plurality of input areas associated with a DataSet. At step 501, the method starts by launching the KeyRing application, typically as the result of a user trigger such as hiting altogether the F12 keyboard key and the right mouse button. At step 502, the pop up window 331 is displayed, showing all the different Keys defined within the KeyRing table 200. At step 503, the user selects a Key by using conventional means, such as the click with the left mouse button on one entry within the pop-up window 331. At step 504, the KeyRing table 200 is accessed for retrieving the attributes of the Key selected at the previous step, including the number of associated fields. At step 505, the local variable "current field" is set equal to the first field of the selected Key. Furthermore the mouse pointer form is updated to reflect the stage of the process. In a preferred embodiment of the present invention, this icon takes a form specifying the number of remaining fields to be passed (see 334 on FIGS. 3F and 336 on FIG. 3G).

At step 506, the KeyRing application waits for a user event specifying that the "current field" must be passed to the DataSet. In a preferred embodiment of the present invention, this event corresponds to the click on the right mouse button, while the left mouse button remained pressed. At step 507, a user event is detected for passing the "current field" of the selected Key. At step 508, the KeyRing passes the "current field" onto the DataSet input area pointed by the mouse pointer. At step 509, a test is performed to check if the "current field" corresponds to the last field of the selected Key, as recorded in the KeyRing table 200. If it is the case, then control is given to step 510; otherwise control is given to step 512. At step 510, the pop-up window 331 is closed. At step 511, the KeyRing applications ends. At step 512, the "current field" local variable is set equal to the next field associated to the selected Key, as recorded in the KeyRing table 200. Then control is given to step 506.

While the invention has been particularly shown and described with reference to a preferred embodiment, it will be understood that various changes in form and detail may be made therein without departing from the spirit, and scope of the invention.

What is claimed is:

1. A method for securely managing multiple keys on a computer system, each key being used to access one or a plurality of computing resources and including a plurality of key fields, said method comprising the steps of:

storing the multiple keys in a key file comprised of a key table, the key table including a multitude of entries, each of the entries corresponding to a respective one of the keys, each of the entries in the key table including a plurality of key fields, each of the key fields of the entry having a name and a value stored in said each key field of the entry, and each of the entries including all of the fields needed to use the key, to which said each entry corresponds, to access one of the computing resources;

displaying on a display screen of the computer system a plurality of input fields for receiving the key fields of one of the keys needed to access one of the computing resources;

receiving a command from a user to access the key file;

displaying the key file simultaneous together with said plurality of input fields on the display screen of the computer system, including displaying a list of all of the keys in the key file;

the user selecting one of the keys in the key file, said one of the keys being used to access said one of the computing resources;

the user interacting with the display of the listing of said selected key and the simultaneous display of the plurality of input fields, using a graphical user interface including a pointing device, to pass the value of each of the key fields of said selected key, one value at a time, from the key table to said input fields including entering the value for each of the key fields into the input field identified on the display screen with the name of said each key field; and giving the user access to the one of the computing resources when the values of all the key fields of the selected key have been passed to the input fields; and wherein:

each of the key fields includes a plurality of sub-fields;

the storing the multiple keys in the key file includes:

storing the name of each of the key fields in a first of the sub-fields of the each key field, storing the value of the each key field in a second of the sub-fields of the each key field, and storing an indicator in a third of the sub-fields of the each key field to indicate that the value held in the second of the sub-fields of the each key field cannot be passed to specified ones of the input fields; and the user interacting with the display further includes:

using a movable and adjustable pointer for pointing to the input fields, said pointer including an icon showing the number of the input fields that need to be filled, and dynamically adjusting said icon after each of the input fields is filled with one of the key values to show how many remaining key values need to be passed to the input fields.

2. The method according to claim 1, wherein the step of the user interacting with the displays on the display screen, comprises the steps of:

dragging the selected key to one of the input fields.

3. The method according to claim 1, wherein the step of the user interacting with the displays on the display screen, comprises the step of:

updating the pointing device icon displayed on the computer screen according to the remaining fields that are still to be passed before the computing resource can be accessed.

4. The method according to claim 1, wherein the step of the user interacting with the displays on the display screen, comprises the step of:

updating the pointing device icon displayed on the computer screen according to the passed key field.

5. The method according to claim 1, wherein the step of the user interacting with the displays on the display screen, comprises the step of:

updating the pointing device icon displayed on the computer screen according to the key field that have already been passed.

6. The method according to claim 1, wherein the step of receiving a command from a user, comprises the step of:

displaying on the computer screen one or plurality of keys.

7. The method according to claim 1, comprising the further step of:

associating with each key field of a key:

means for identifying the key field;

a content to paste in an input field; and an indication specifying that the content to paste must only be pasted in a protected input field, each input field of a computing resource being defined as either protected or unprotected, the content pasted in a protected input field being hidden from the user.

8. The method according to claim 1, comprising the further step of: recording one or a plurality of the keys in a key ring file.

9. The method according to claim 1, comprising the further steps of:

associating with each key; and means for identifying and reaching one or a plurality of computing resources.

10. The method according to claim 1, comprising the further steps of:

retrieving a secret private key under which information recorded in the key file is encrypted; and encrypting and decrypting said key file using said secrete private key.

11. The method according to claim 1, wherein the steps of the method are transparent for said one or plurality of computing resources.

12. A system for securely managing multiple keys used to access computing resources, each of the keys including a plurality of key fields, said system comprising:

a storage device for storing the multiple keys in a key file comprised of a key table, the key table including a multitude of entries, each of the entries corresponding to a respective one of the keys, each of the entries in the key table including a plurality of editable key fields, each of the key fields of the entry having a name and a value stored in said each key field of the entry, and each of the entries including all of the fields needed to use the key, to which said each entry corresponds, to access one of the computing resources;

a computer system for displaying on a display screen of the computer system a plurality of input fields for receiving the key fields of one of the keys needed to access one of the computing recourses; for receiving a command from a user to access the key file; for displaying the key file simultaneous together with said plurality of input fields on the display screen of the computer system, including displaying a list of all of the keys in the key file; for receiving input from the user selecting one of the keys in the key file, said one of the keys being used to access said one of the computing resources;

means for enabling the user to interact with the display of the listing of said selected key and the simultaneous display of the plurality of input fields, using a graphical user interface including a pointing device, to pass the value of each of the key fields of said selected key, one value at a time, from the key table to said input fields including entering the value for each of the key fields into the input field identified on the display screen with the name of said each key field; and means for giving the user access to the one of the computing resources when the values of all the key fields of the selected key have been passed to the input fields; and wherein:

each of the key fields includes a plurality of sub-fields;

a first of the sub-fields holds the name of said each key field;

a second of the sub-fields holds the value of said each key field;

a third of the sub-fields holds an indicator including a first value to indicate that the value of said second of the sub-fields cannot be passed to specified fields;

the display includes a movable and adjustable pointer for pointing to the input fields and to the key fields, and said pointer includes an icon showing the number of the input fields that need to be filled; and said icon is dynamically adjusted after each of the input fields is filled with one of the key values to show how many remaining key values need to be passed to the input fields.

13. The system according to claim 12, wherein the means for enabling includes:

means for dragging the selected key to one of the input fields.

14. A program storage device including a tangible storage medium readable by machine, tangibly embodying a program of instructions executable by the machine to perform method steps for securely managing multiple keys on a computer system, each of said keys being used to access one or a plurality of computing resources and including a plurality of key fields, the method steps comprising:

storing the multiple keys in a key file comprised of a key table, the key table including a multitude of entries, each of the entries corresponding to a respective one of the keys, each of the entries in the key table including a plurality of editable key fields, each of the key fields of the entry having a name and a value stored in said each key field of the entry, and each of the entries including all of the fields needed to use the key, to which said each entry corresponds, to access one of the computing resources;

receiving a command from a user to access the key file;

displaying the key file simultaneous together with said plurality of input fields on the display screen of the computer system, including displaying a list of all of the keys in the key file;

the user selecting one of the keys in the key file, said one of the keys being used to access said one of the computing resources;

the user interacting with the display of the listing of said selected key and the simultaneous display of the plurality of input fields, using a graphical user interface including a pointing device, to pass the value of each of the key fields of said selected key, one value at a time, from the key table to said input fields, including entering the value for each of the key fields into the input field identified on the display screen with the name of said each key field; and giving the user access to the one of the computing resources when the values of all the key fields of the selected key have been passed to the input fields; and wherein:

each of the key fields includes a plurality of sub-fields;

the storing the multiple keys in the key file includes:
 storing the name of each of the key fields in a first of the sub-fields of the each key field, storing the value of the each key field in a second of the sub-fields of the each key field, and storing an indicator in a third of the sub-fields of the each key field to indicate that the value held in the second of the sub-fields of the each key field cannot be passed to specified ones of the input fields; and the user interacting with the display further includes:
 using a movable and adjustable pointer for pointing to the input fields, said pointer including an icon showing the number of the input fields that need to be filled, and
 dynamically adjusting said icon after each of the input fields is filled with one of the key values to show how many remaining key values need to be passed to the input fields.

15. The program storage device according to claim 14, wherein the step of the user interacting with the display, comprises the steps of:
 dragging the selected key to one of the input fields.

16. A method of deploying a computer program product for securely managing multiple keys on a computer system, each of said keys being used to access one or a plurality of computing resources, the method comprising:
 deploying the computer program product on the computer system; and
 wherein when executed, the computer program performs the steps of:

storing the multiple keys in a key file comprised of a key table, the key table including a multitude of entries, each of the entries corresponding to a respective one of the keys, each of the entries in the key table including a plurality of editable key fields, each of the key fields of the entry having a name and a value stored in said each key field of the entry, and each of the entries including all of the fields needed to use the key, to which said each entry corresponds, to access one of the computing resources;

displaying on a display screen of the computer system a plurality of input fields for receiving the key fields of one of the keys needed to access one of the computing resources;

receiving a command from a user to access the key file;

displaying the key file simultaneous together with said plurality of input fields on the display screen of the computer system, including displaying a list of all of the keys in the key file;

the user selecting one of the keys in the key file, said one of the keys being used to access said one of the computing resources;

the user interacting with the display of the listing of said selected key and the simultaneous display of the plurality of input fields, using a graphical user interface including a pointing device, to pass the value of each of the key fields of said selected key, one value at a time, from the key table to said input fields, including entering the value for each of the key fields into the input field identified on the display screen with the name of said each key field; and giving the user access to the one of the computing resources when the values of all the key fields of the selected key have been passed to the input fields; and wherein:

each of the key fields includes a plurality of sub-fields;

the storing the multiple keys in the key file includes:
 storing the name of each of the key fields in a first of the sub-fields of the each key field, storing the value of the each key field in a second of the sub-fields of the each key field, and storing an indicator in a third of the sub-fields of the each key field to indicate that the value held in the second of the sub-fields of the each key field cannot be passed to specified ones of the input fields; and the user interacting with the display further includes:
 using a movable and adjustable pointer for pointing to the input fields, said pointer including an icon showing the number of the input fields that need to be filled, and
 dynamically adjusting said icon after each of the input fields is filled with one of the key values to show how many remaining key values need to be passed to the input fields.

17. The method of deploying a computer program product according to claim 16, wherein the step of the user interacting with the display, comprises the steps of:
 dragging the selected key to one of the input fields.

* * * * *